April 21, 1942.   A. HARCOS   2,280,422
FISHING TOOL
Filed Dec. 11, 1940

INVENTOR:
ALADAR HARCOS,
BY
ATTORNEYS.

UNITED STATES PATENT OFFICE 2,280,422

FISHING TOOL

Aladar Harcos, Los Angeles, Calif.

Application December 11, 1940, Serial No. 369,539

11 Claims. (Cl. 294—115)

My invention relates to fishing tools and is particularly directed to a device of this description which may be lowered into oil and water wells and employed for fishing and recovering objects therefrom and which may be used generally for picking up objects of various kinds at a point which is remote from the place where the device is controlled.

My invention relates primarily to improvements in a device of the character described which may be utilized for recovering objects from otherwise inaccessible places at a distance from the control of the device and which will retain and hold the objects until it is found desirable to release them by the mechanical operation of the device.

My invention more particularly relates to a device of the character described which incorporates a plurality of arms or claws which may be opened and closed in order to grasp and hold objects of various kinds. The device is simple and sturdy in construction, has a simple, positive operation, and may be easily understood and operated. Such devices are inexpensive to manufacture and have a wide application of use in various industries, some of which may be enumerated as follows:

When employed in conjunction with oil and water wells, the devices may be designed to run on drill pipe or they may be separately lowered into a well and operated independently of any fishing string or other tool string. They may be lowered into the hole either in an open or closed position. When the claw members contact or engage the object to be removed from the hole it will be found that the operation thereof is simple and positive and a maximum gripping force can be exercised with a minimum of effort or power applied to the device. In connection with oil and water wells, such devices may be used generally for routine cleaning and fishing jobs and for recovering all junk ranging in size from bolts, nuts and steel splinters to large pieces of iron, drill collars, tool joints, bailers, sucker rods and other lost tools, broken pipe and the like. It will be found that in practical use such devices will readily pick up and bring out of the hole anything which can be grasped by the claws.

The claws may be formed with various shapes depending upon the purpose for which they are utilized. I have illustrated a relatively flat wedge shaped claw with the lower tip thereof curved inwardly in the shape of a hook.

Above the claws are spade shaped plates which tend to hold and support any object which is picked up by the claws.

Devices embodying my invention may be made with sharp reaming edges on the claws so as to convert them into cutting members, and utilized to cut a shallow hole around a core; the material being fished for is carried on top of the core and with the core may be removed from the hole.

Devices embodying my invention may be used in connection with cranes and devices of a similar character and may be employed in many industries for raising, transporting and lowering weights of various kinds.

Devices embodying my invention with equally obvious changes and modifications may be utilized for boring, cutting, digging, abrading, and the like, in certain types of formations. Such use would necessitate the employment of cutters or reamers instead of the claws shown in the preferred embodiment of my invention.

An object of my invention is to provide in a device of the character described a tool which is designed to grasp, raise, transport and release or lower objects of various kinds.

Another object of my invention is to provide in a device of the character described a tool with adjustable claws or "grab" means which may be opened and closed from a remote point as desired, and which are designed to pick up and hold objects which are to be moved from place to place.

A further specific object of my invention is to provide in a device of the character described a positively controlled closure means which may be operated with a minimum of stress between the movable parts thereof.

An important principle utilized in that connection is a plurality of bearings between a rotatable spindle and a bearing member causing a high resistance value for reducing friction. For this purpose the bearing engagement should be between relatively hard metals which is possible in my invention irrespective of the materials which are used in the fishing tool proper.

My device possesses a high factor of safety against pressure operating strains and displacement. It will be found that in use devices which embody my invention open and close easily and withstand wear or fracture exceptionally well.

The form of the claws, spade shaped plates, arms, links and other component parts and features, hereinafter described, may be altered according to my invention and various necessary parts installed or substituted therefor without changing the function and mode of operation of the device and without otherwise changing the construction thereof.

A further specific object of my invention is to provide a fishing tool which incorporates a rotatable spindle with a thrust bearing located at the lower end thereof. The said spindle is formed with external screw threads which engage with internal threads on a jacket block. Said block incorporates four horizontally extending shoulders. Each of those shoulders has pivoted to it a pair of links which cooperate by means of a pin and slot connection with an arm which is pivoted to the lower end of the bearing member. The use of a greater or lesser number of links and arms would be considered an equivalent. The claws or "grab means" are pivoted at their upper ends to the links and are pivoted near their center portions to the lower ends of the arms. The claws are adapted to open and close when the spindle is rotated and engages the screw threads on the jacket block.

Other objects and advantages will become apparent from a further description of my invention in reference to the accompanying drawing.

The preferred embodiment of my invention is illustrated, described and claimed in this application. Various changes and alterations may be made therein, as desired, within the spirit and scope of my invention.

Figure 1:
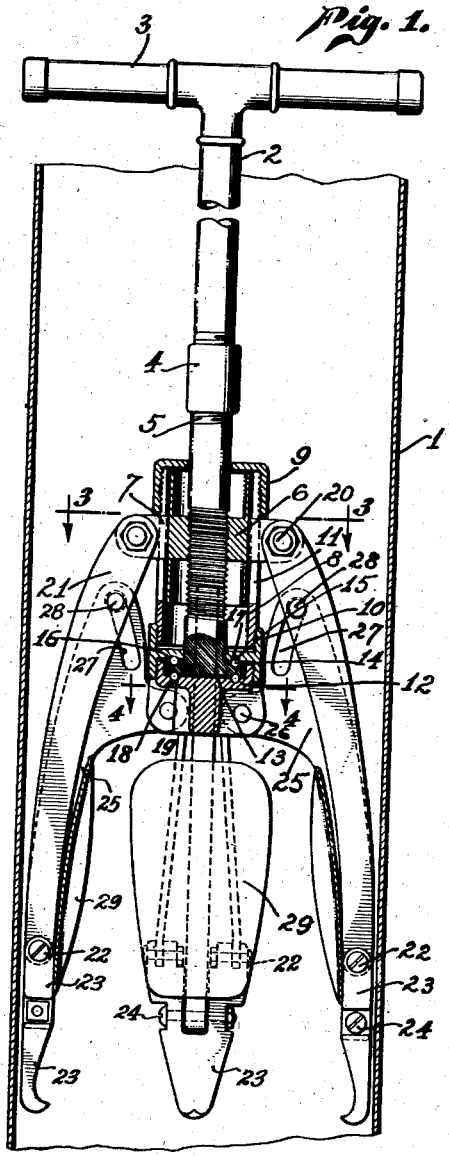
Figure 1 is a vertical cross-sectional view of a fishing tool embodying my invention with the claws in open position.
Figure 2:
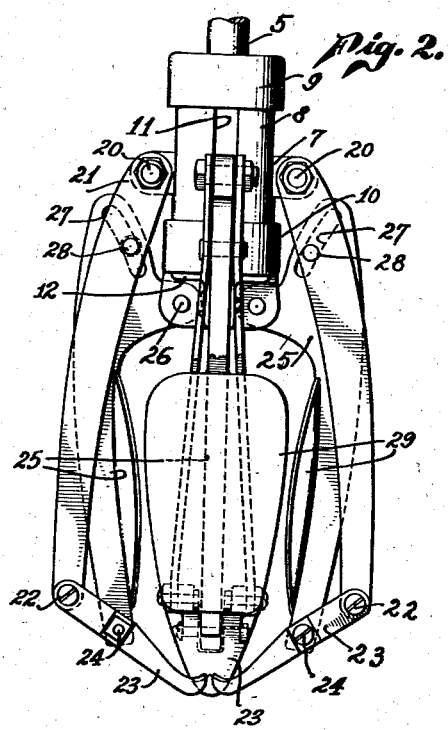
Figure 2 is a side elevational view of the same device with the upper portion of the shaft omitted and the claws in closed position.
Figure 3:
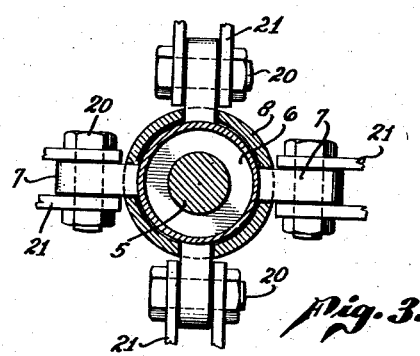
Figure 3 is a horizontal cross-sectional view of the same device taken on the line 3—3 of Figure 1.
Figure 4:
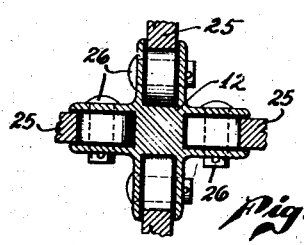
Figure 4 is a horizontal cross-sectional view of the same device taken on the line 4—4 of Figure 1.

The drawing shows a device embodying the preferred form of my invention. Various changes and modifications may be made in the form and structure thereof without departing from the scope of my invention.

Figure 1 illustrates a device incorporating my invention disposed within a casing 1 of a water or oil well. The claws of the device are in an open position.

The device comprises a rotatable shaft or stem 2 which is adapted to carry a handle 3 which may be secured thereto in any conventional manner. In place of the handle any stationary type of wheel or lever may be used with which to turn or rotate the shaft or, if desired, power means may be used for that purpose. The shaft may be hollow and is externally right hand threaded as shown for engagement with a coupling 4 which in turn engages external threads on the upper portion of a spindle 5. A spindle alone may be used.

The threads on the spindle near its lower end are left hand and are adapted to engage with internal threads on a cylindrical jacket block 6 which in vertical cross-section is H shaped and which is formed with 4 horizontally extending arms 7, although a greater or less number may be used and would be considered an equivalent construction.

A sleeve 8 encloses the spindle and jacket block. At its upper portion the sleeve is externally threaded for engagement with a cap 9, and at its lower portion is externally threaded for engagement with a cap 10. Vertical slots 11 are formed in the walls of the sleeve 8 corresponding in number to the number of horizontal arms 7.

The second cap 10 is internally threaded at its lower portion for engagement with external threads on a bearing member 12.

The lower end of the spindle is formed in the shape of a flange or disc 13. In the upper surface thereof is a shallow annular depression 14 adapted to accommodate a plurality of ball bearings 15. A corresponding shallow annular depression 16 is formed in the lower surface of the cap 10 and constitutes a complementary part to form a ball race for the said ball bearings. A similar construction is formed by a shallow annular depression 17 in the lower surface of the flange or disc 13 which is adapted to accommodate a plurality of ball bearings 18. A corresponding shallow annular depression 19 is formed in the upper surface of the bearing member 12 and constitutes a complementary part to form a ball race for the said ball bearings. All of the parts constituting the thrust bearing previously described should be of relatively hard metal.

Pivoted at 20 to each horizontally extending shoulder 7 are twin links 21. The lower ends of each pair of links are pivoted at 22 to a claw 23 which is likewise pivoted at 24 to the lower end of an arm 25. The arm is pivoted at 26 to the lower portion of the bearing member 12. Formed in the upwardly extending portion of each arm is a slot 27 designed to accommodate a pin 28 which serves to connect together in sliding cooperation each arm with a pair of links.

A spade shaped plate 29 is separately welded to or cast integral with each arm 25, as may be desired.

Obviously a greater or lesser number of links and/or arms could be utilized, as desired, within the spirit of my invention.

In assembling the device, the sleeve 8 with its lower cap 10 and bearing member 12, including the two sets of ball bearings, can be assembled together about the spindle. The jacket block 6 can then be engaged with the control threads on the spindle so that the shoulders fall in the slots 11 in the sleeve 8. It is preferable that the diameter of the spindle be slightly reduced above the control threads to facilitate slipping the block thereover. The cap 9 can then be screwed on the upper end of the sleeve, after which the shaft 2 may be joined to the spindle by means of the coupling 4. The links 21 can be bolted to the shoulders at any time and at their lower end of the claws. The arms 25 can likewise be bolted to the lower portion of the bearing member and then bolted at their lower ends to the claws.

The operation of the fishing tool which I have described and which incorporates my invention may be explained as follows: Assuming that the claws are in an open or extended position as in Figure 1 and the device is to be used in an oil or water well for "fishing" purposes, the device is lowered in the hole to the bottom thereof or to any point where the object is resting which is to be picked up. The handle and shaft are then rotated which in turn impart rotation to the spindle. Stress and strain are compensated for by the thrust bearing at the lower end of the spindle. As the spindle rotates the external threads thereon engage with the threads on the jacket block and cause the said block with its corresponding horizontally extending shoulders and connecting links to be moved downwardly. Due to the pin and slot connection between each pair of links and the corresponding arm, and the pivot connection between each claw, pair of links and corresponding arm, the said claws are caused to close and thereby engage and grasp and hold the object or objects to be removed from the hole and retain same with the aid of the spade shaped plates, until the handle and shaft are rotated in the opposite direction, which will cause the claws to open thereby releasing the object or objects which has been retained thereby. The vertical slots disposed in the jacket block 8 permit the free vertical movement of the horizontal shoulders 7 therein. The same operation as above described would occur where the device is used for other purposes than in recovering objects from oil or water wells and need not be repeated or further explained.

Having described my invention, what I claim as new and desire to secure by Letters Patent is:

1. A fishing tool comprising: rotatable means, a block threadedly engaging said rotatable means and adapted for longitudinal movement thereon, a sleeve assembly mounted on the rotatable means and slidably engaging the block to restrain the said block against rotation, claw means consisting of a plurality of claws for gripping objects, a plurality of links and arms coupling said claws to the block and sleeve assembly, said claws being adapted to open and close upon the longitudinal movement of said block.

2. A fishing tool comprising: rotatable means consisting of a shaft, a spindle coupled to the shaft, and means for rotating said shaft and spindle; a block threadedly mounted on the spindle for longitudinal movement upon rotation of the spindle, a sleeve assembly mounted on the spindle for longitudinal movement therewith and slidably engaging the block to prevent relative rotation of the sleeve and block, links mounted on the block, arms pivotally mounted on the sleeve assembly, and claws pivotally mounted on said links and arms and adapted to open and close upon relative longitudinal movement of said links and arms.

3. A fishing tool comprising: a rotatable spindle, a flange on the lower end of the spindle, a thrust bearing on the flange, a block threadedly mounted on the spindle and adapted for longitudinal movement upon rotation of the spindle, laterally extending shoulders on the block, a sleeve assembly partly enclosing the said spindle and block and adapted to restrain the block against rotation, claw means consisting of a plurality of claws for gripping objects, a plurality of links and arms coupling said claws to the block and sleeve assembly, said claws being adapted to open and close upon the longitudinal movement of said block.

4. A fishing tool comprising: rotatable means consisting of a shaft, a spindle coupled thereto, a block threadedly mounted on said spindle, a sleeve assembly mounted on the spindle including a sleeve, a cap threadedly mounted on each end of the sleeve, a bearing member threadedly connected to the cap on the lower end of the sleeve, a plurality of bearings between the lower end of the spindle and the bearing member and the cap on the lower end of the sleeve; links mounted on the block, arms pivotally mounted on the bearing member, and claws pivotally mounted on said links and arms and adapted to open and close upon longitudinal movement of the said block.

5. A fishing tool comprising: a rotatable spindle, a block having laterally extending shoulders threadedly mounted on the spindle for longitudinal movement upon rotation of the spindle, a sleeve assembly mounted on the spindle, including a sleeve with a plurality of longitudinal slots therein and adapted for slidable engagement with the shoulders on the block, and a bearing member mounted on the lower end of said sleeve; claw means including a plurality of links pivotally connected to each of said shoulders on the block, a plurality of arms pivotally connected to the said bearing member, pin and slot connections between each pair of links and each arm, a spade shaped member on each said arm, a claw pivotally connected to each said pair of links and to each arm and adapted to open and close upon relative longitudinal movement of the said links and arms.

6. A fishing tool comprising: rotatable means including a shaft, a spindle coupled thereto, a thrust bearing on the lower end of said spindle, a block threadedly engaging the spindle and adapted for longitudinal movement thereon, laterally extending shoulders on the block, a bearing member at the lower end of the said spindle, a pair of links pivotally connected to each said shoulder on the block, a plurality of arms pivotally connected to the said bearing member and cooperating with the said links by means of a pin and slot connection, a claw for gripping objects pivotally connected to each said pair of links and to each cooperating arm, the said claws being adapted to open and close upon relative longitudinal and lateral movements of said links and arms.

7. A fishing tool comprising: rotatable means including a shaft, a spindle coupled thereto, a block threadedly engaging the lower end of the spindle and adapted for longitudinal movement thereon, a plurality of horizontally extending shoulders on the said block, a bearing member at the lower end of the said spindle, a sleeve mounted on the spindle and threadedly connected to the said bearing member, a plurality of longitudinal slots in the said sleeve adapted to receive the horizontally extending shoulders on the block and to permit the free longitudinal movement of said shoulders, a link pivoted to each said shoulder, a plurality of arms pivotally connected to the said bearing member and cooperating with the said links by means of a pin and a slot connection, a spade shaped member on each said arm, a plurality of claws pivotally connected to the said links and arms and adapted to open and close upon rotation of the spindle and the corresponding longitudinal movement of the said block.

8. A tool which is adapted to recover objects from an oil or water well, said tool comprising means at the top of said well for rotating a shaft and a connecting spindle, a block threadedly mounted on said spindle and adapted for longitudinal movement upon rotation of the spindle, a sleeve assembly mounted on the spindle and slidably engaging the block to restrain the block against rotation, links connected to the said block, arms connected to the said sleeve assembly and connected by means of pins and slots to the said links, "grab" means pivotally connected to the said links and arms adapted to engage and hold objects which are to be removed from the well, the said "grab" means being adapted to open and close upon the corresponding longitudinal movement of the block and the relative longitudinal and lateral movement of said links and arms.

9. A tool for recovering objects at a point which is remote from the place where the tool is controlled, said tool comprising a rotatable spindle, a block threadedly mounted on said spindle and adapted for longitudinal movement upon the rotation of the spindle, a sleeve assembly including a sleeve with longitudinal slots formed therein to restrain the said block against rotation, a bearing member threadedly connected to the lower end of the said sleeve, a plurality of curved links mounted on the said block, a plurality of curved arms pivotally connected to the said bearing member, a slot and pin connection between each pair of links and each arm, a relatively wide spade shaped member on each said arm, a claw pivotally connected to each said pair of links and to each arm and adapted to grip or release objects upon longitudinal movement of the said block and corresponding movement of the said links and arms.

10. A device for raising, transporting and lowering weights of various kinds at a point remote from where the device is controlled, said device comprising rotatable means, a block threadedly mounted on said rotatable means and adapted to move longitudinally thereof, a plurality of claws for gripping objects, coupling means between the said claws and the said block including a plurality of links, a plurality of arms, said links and arms cooperating together by means of a pin and slot connection upon the longitudinal movement of said block.

11. A device for recovering objects from a point remote from the control of said device, said device comprising a rotatable member, a block threadedly connected to said member and adapted to move longitudinally thereof, a sleeve assembly mounted on said rotatable member, radially extending shoulders formed on the said block, links pivoted to the said shoulders, arms slidably connected to said links and pivotally connected to the said sleeve assembly, a slot in the upper portion of each said arm, a pin extending through the upper portion of each said pair of links and adapted for slidable engagement with the said slot in each of said arms, a claw member pivotally connected to each pair of links and to each said arm, a plurality of slots in the said sleeve assembly adapted to permit the free vertical movement therein of the said radially extending shoulders on the said block.

ALADAR HARCOS.